United States Patent [19]
Rosario

[11] Patent Number: 5,655,807
[45] Date of Patent: Aug. 12, 1997

[54] COVER FOR THE BED OF A PICKUP TRUCK WITH AN ASSOCIATED ROLL-UP HOUSING

[76] Inventor: Israel Rosario, 6128 Mayo St., Hollywood, Fla. 33023

[21] Appl. No.: 622,427

[22] Filed: Mar. 25, 1996

[51] Int. Cl.⁶ ................................................. B60P 7/02
[52] U.S. Cl. ................................................. 296/98; 296/100
[58] Field of Search ........................... 296/100, 98, 104

[56] References Cited

U.S. PATENT DOCUMENTS

| | | | |
|---|---|---|---|
| 4,479,677 | 10/1984 | Gulette et al. | 296/98 |
| 4,784,427 | 11/1988 | Burgess | 296/98 |
| 5,056,855 | 10/1991 | Moravsky | 296/98 |
| 5,121,960 | 6/1992 | Wheatley | 296/100 |
| 5,179,991 | 1/1993 | Haddad, Jr. | 296/98 X |

*Primary Examiner*—Joseph D. Pape

[57] ABSTRACT

A cover for the bed of a pickup truck with an associated roll-up housing adapted for use in association with a truck having a cab and a truck bed. The truck bed has two side walls, a tailgate and a rear wall. The apparatus further comprises a flexible cover having long parallel side edges and short front and rear edges. A container has an elongated cylindrical central extent and concentric end caps thereover. The end caps are formed with a continuous slot for the passage of the cover therethrough. The container is coupled to the rear wall of the truck and has a central spool rotatably coupled within the end caps. The rear edge of the cover is coupled to the spool. The cover is positionable in a wound orientation around the spool and an extended orientation over the bed of a pickup truck. A support assembly includes two semicircular shaped bars coupled to the side walls of the truck.

4 Claims, 7 Drawing Sheets

COVER FOR THE BED OF A PICKUP TRUCK WITH AN ASSOCIATED ROLL-UP HOUSING

BACKGROUND OF THE INVENTION

1. Field of the Invention

The present invention relates to a cover for the bed of a pickup truck with an associated roll-up housing and more particularly pertains to covering the bed of a flat-bed truck with sheet material positionable in a first orientation over the bed and a second orientation rolled up in a tubular container adjacent to the cab.

2. Description of the Prior Art

The use of devices for covering a wide variety of things constructed of various designs and configurations is known in the prior art. More specifically, devices for covering a wide variety of things constructed of various designs and configurations heretofore devised and utilized for the purpose of covering objects and uncovering them through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,730,866 to Nett a pickup bed tonneau cover mounting.

U.S. Pat. No. 4,786,099 to Mount discloses a truck bed cover device.

U.S. Pat. No. 4,807,921 to Cahmpie III, et al discloses a sliding cover for a truck bed.

U.S. Pat. No. 5,040,843 to Russell et al discloses a roll-up pickup bed cover with integral tailgate cover and lock.

U.S. Pat. No. 5,251,950 to Bernardo discloses a rolling cover for a truck utility bed having improved reel support housing and guide track clamps.

U.S. Pat. No. 139,794 to Kellum discloses window-screens.

Japanese Patent Number 141,920 to Mutsugi Mai discloses a car body cover device of vehicle.

U.S. Pat. No. 4,248,475 to Johnsen discloses a bow assembly for truck bed covers.

U.S. Pat. No. 4,854,633 to Kraft et al. discloses a roof bow locking system.

U.S. Pat. No. 3,146,824 to Veilleux discloses an apparatus for covering truck bodies.

U.S. Pat. No. 4,923,240 to Swanson discloses an apparatus for releasably securing a cover to a structure.

U.S. Pat. No. 839,732 to Crocker discloses a window screen.

U.S. Pat. No. 1,242,878 to Bliss discloses an invisible roller screen.

U.S. Pat. No. 2,811,321 to La Barre discloses a truck tarpaulin reel.

U.S. Pat. No. 3,050,075 to Kaplan discloses a retractable vehicle covering device.

In this respect, the cover for the bed of a pickup truck with an associated roll-up housing according to the present invention substantially departs from the conventional concepts and designs of the prior art, and in so doing provides an apparatus primarily developed for the purpose of covering the bed of a pickup truck with sheet material positionable in a first orientation over the bed and a second orientation rolled up in a tubular container adjacent to the cab.

Therefore, it can be appreciated that there exists a continuing need for a new and improved cover for the bed of a pickup truck with an associated roll-up housing which can be used for covering the bed of a flat-bed truck with sheet material positionable in a first orientation over the bed and a second orientation rolled up in a tubular container adjacent to the cab. In this regard, the present invention substantially fulfills this need.

SUMMARY OF THE INVENTION

In view of the foregoing disadvantages inherent in the known types of devices for covering a wide variety of things constructed of various designs and configurations now present in the prior art, the present invention provides an improved cover for the bed of a pickup truck with an associated roll-up housing. As such, the general purpose of the present invention, which will be described subsequently in greater detail, is to provide a new and improved cover for the bed of a pickup truck with an associated roll-up housing apparatus and method which has all the advantages of the prior art and none of the disadvantages.

To attain this, the present invention essentially comprises a new and improved cover for the bed of a pickup truck with an associated roll-up housing comprising, in combination: a truck having a cab and a truck bed, the truck bed having two side walls, a tailgate and a rear wall positioned adjacent to the cab, the rear wall having an upper extent; two brackets each formed in an L-shaped configuration with a horizontal segment and a vertical segment, each bracket being coupled adjacent the upper extent of the rear wall of the truck bed; a roll-up housing including a base member and a cylinder member, the base member being formed in a generally rectangular configuration with an essentially hollow interior, an open front and an upper slot, the base member being coupled to the horizontal segments of the brackets, the cylinder member being formed in a generally cylindrical configuration with two open ends, an essentially hollow interior and a lower slot, the cylinder member being coupled upon the base member with the respective slots in alignment, two end caps each being coupled over an open end of the cylinder member, each end cap including a central axial aperture and a lower slot positioned in alignment with the lower slot of the cylinder member, the cylinder including a central spool rotatably coupled within the axial apertures of the end caps, a coil spring being positioned within each end of the cylinder member and coupled to the spool; a flexible cover having long parallel side edges, short front and rear edges and a central extent, each side edge including a plurality of snap coupling devices positioned therealong, the rear edge being coupled to the spool of the cylinder member, an end cover frame formed in a rectangular configuration and coupled to the front edge of the cover, a pull cord being affixed to the center point of the end cover frame, the cover being positioned in a wound orientation around the spool of the cylinder member in a stowed orientation, the cover being positioned over the bed of the pickup truck in an extended orientation with the central extent of the cover extending through the aligned slots of the base member and cylinder member, the coil springs of the cylinder member functioning to urge the cover to a wound orientation; and a support assembly including two side shafts and two inner bars, each side shaft being formed in an elongated rectangular configuration with an inner surface and an outer surface, each outer surface including a plurality of snap coupling devices positioned therealong, each side shaft being coupled upon a side wall of the truck bed, each inner bar being formed in a generally semicircular configuration with two free ends and a linear central rod, each central rod having two bolt holes extending therethrough, the free ends of each inner bar being coupled to the inner surface of a side shaft, the central rods of each inner bar being coupled together by two bolts and nuts, the inner bars extending horizontally across the bed of the pickup truck, in an extended orientation the cover being positioned over the inner bars with the snap coupling devices of the cover being coupled to the snap coupling devices of the side shafts.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cover for the bed of a pickup truck with an associated roll-up housing which has all the advantages of the prior art devices for covering a wide variety of things constructed of various designs and configurations and none of the disadvantages.

It is another object of the present invention to provide a new and improved cover for the bed of a pickup truck with an associated roll-up housing which may be easily and efficiently manufactured and marketed.

It is a further object of the present invention to provide a new and improved cover for the bed of a pickup truck with an associated roll-up housing which is of a durable and reliable construction.

An even further object of the present invention is to provide a new and improved cover for the bed of a pickup truck with an associated roll-up housing which is susceptible of a low cost of manufacture with regard to both materials and labor, and which accordingly is then susceptible of low prices of sale to the consuming public, thereby making such devices for covering a wide variety of things constructed of various designs and configurations economically available to the buying public.

Still yet another object of the present invention is to provide a new and improved cover for the bed of a pickup truck with an associated roll-up housing which provides in the apparatuses and methods of the prior art some of the advantages thereof, while simultaneously overcoming some of the disadvantages normally associated therewith.

Still another object of the present invention is to cover the bed of a pickup truck with sheet material positionable in a first orientation over the bed and a second orientation rolled up in a tubular container adjacent to the cab.

Lastly, it is an object of the present invention to provide a new and improved cover for the bed of a pickup truck with an associated roll-up housing adapted for use in association with a truck having a cab and a truck bed. The truck bed has two side walls, a tailgate and a rear wall. The apparatus further comprises a flexible cover having long parallel side edges and short front and rear edges. A container has an elongated cylindrical central extent and concentric end caps thereover. The end caps are formed with a continuous slot for the passage of the cover therethrough. The container is coupled to the rear wall of the truck and has a central spool rotatably coupled within the end caps. The rear edge of the cover is coupled to the spool. The cover is positionable in a wound orientation around the spool and an extended orientation over the bed of a pickup truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
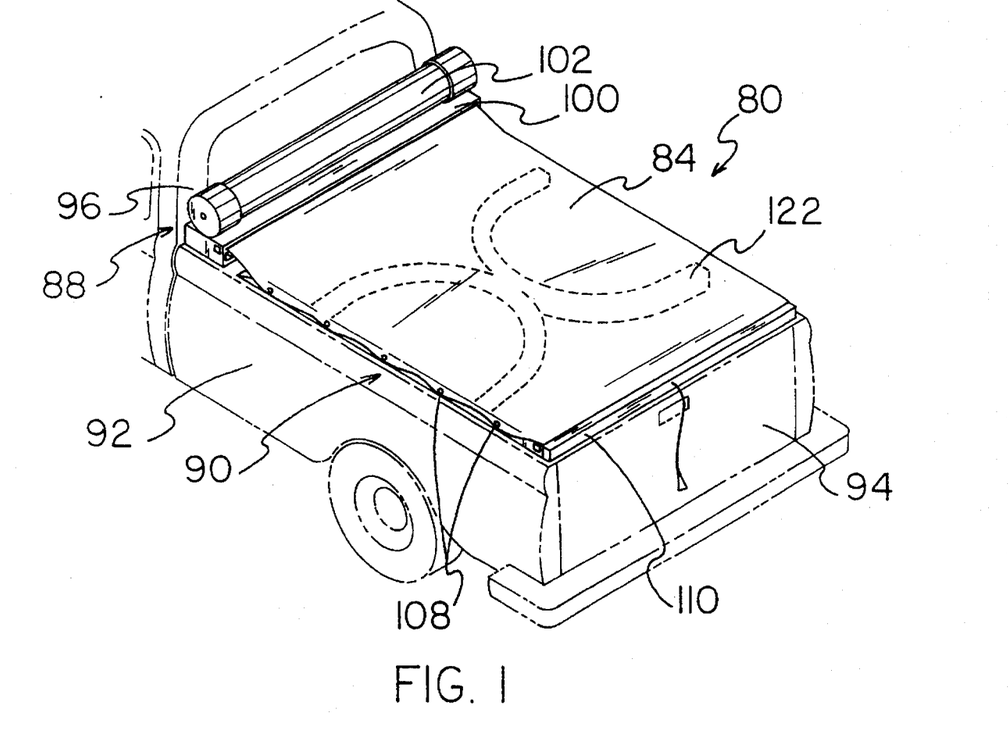
FIG. 1 is a perspective illustration of the preferred embodiment of the cover for the bed of a pickup truck with an associated roll-up housing constructed in accordance with the principles of the present invention.

With reference now to the drawings, and in particular to FIG. 1 thereof, a new and improved cover for the bed of a pickup truck with an associated roll-up housing embodying the principles and concepts of the present invention and generally designated by the reference numeral 80 will be described.

The present invention, the new and improved cover for the bed of a pickup truck with an associated roll-up housing, is comprised of a plurality of components. Such components in their broadest context include a roll-up housing 82, a flexible cover 84 and a support assembly 86. Such components are individually configured and correlated with respect to each other so as to attain the desired objective.

In the preferred embodiment a truck 88 having a cab and a truck bed 90 is included with the apparatus. The truck bed has two side walls 92, a tailgate 94 and a rear wall 96 positioned adjacent to the cab. The rear wall has an upper extent. In alternate embodiments of the apparatus a truck is not included, rather the apparatus is adapted for use in association with an existing truck. Note FIG. 1.

Figure 6:
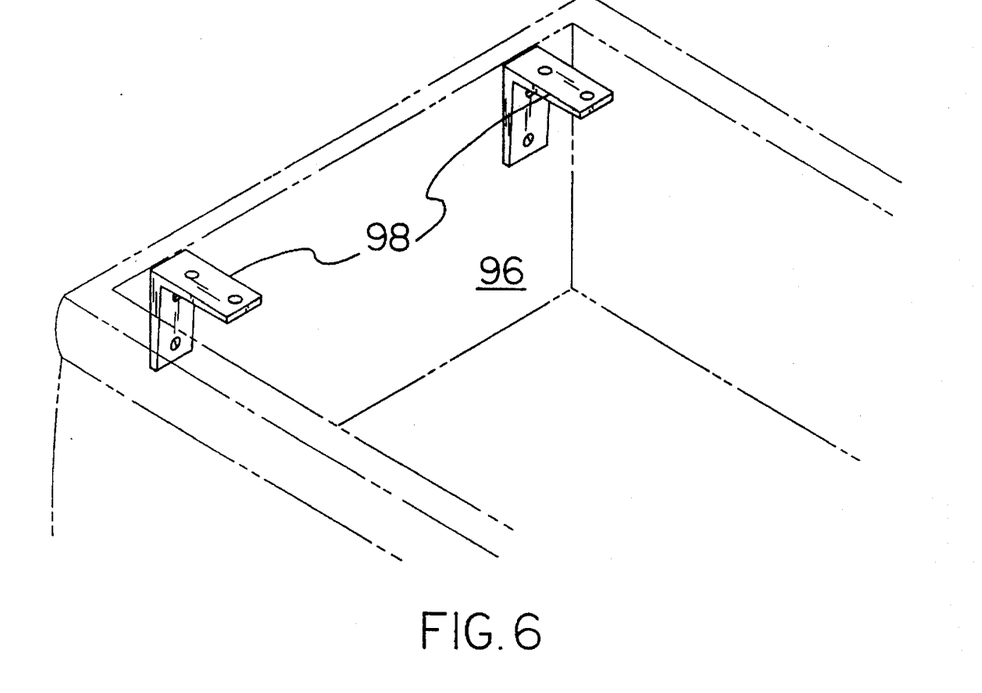
FIG. 6 is a perspective view of the brackets of the preferred embodiment of the apparatus.

Two brackets 98 are included with the apparatus. Each bracket is formed in an L-shaped configuration with a horizontal segment and a vertical segment. The vertical segment of each bracket is coupled adjacent the upper extent of the rear wall of the truck bed. The brackets are fabricated of steel in the preferred embodiment. Note FIG. 6.

Figure 3:
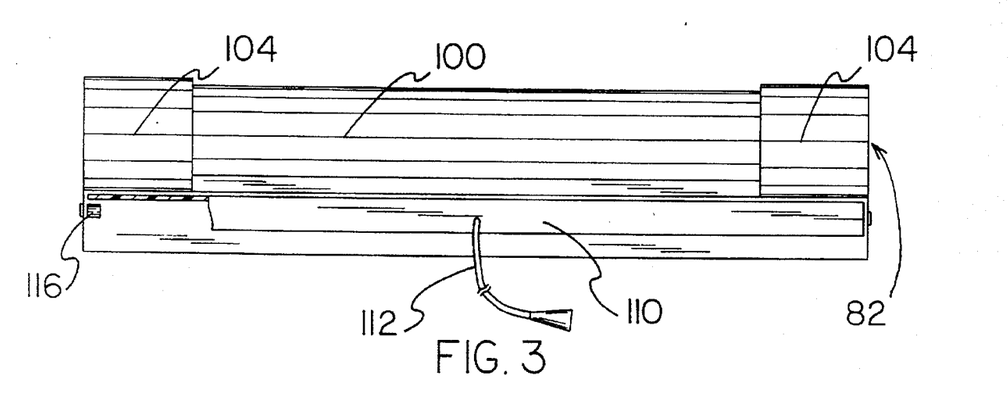
FIG. 3 is a front elevational view of the roll-up housing of the apparatus.
Figure 4:
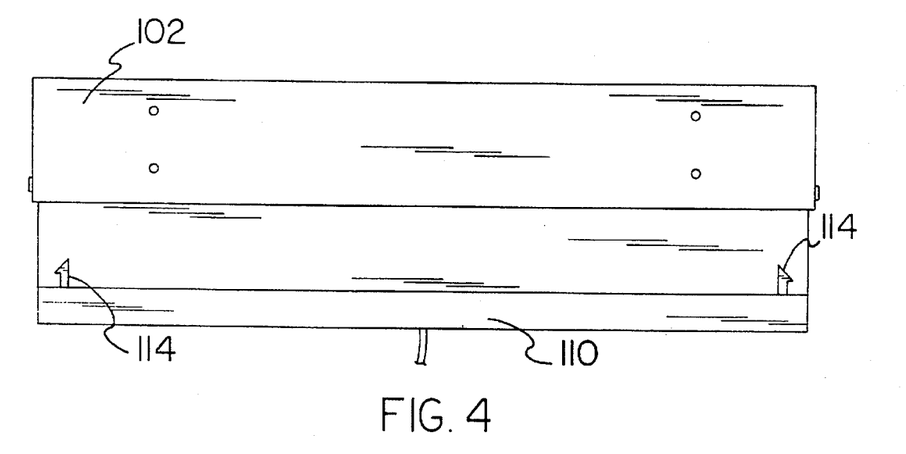
FIG. 4 is a bottom plan view of the roll-up housing of the apparatus.

A roll-up housing 82 includes a base member 100 and a cylinder member 102. The base member is formed in a generally rectangular configuration with an essentially hollow interior, an open front and an upper slot. The base member is coupled to the horizontal segments of the brackets. The cylinder member 102 is formed in a generally cylindrical configuration with two open ends, an essentially hollow interior and a lower slot. The cylinder member is coupled upon the base member with the respective slots in vertical alignment. In an operative orientation the flexible cover is positioned through the slots. Note FIGS. 1, 3 and 4.

Figure 19:
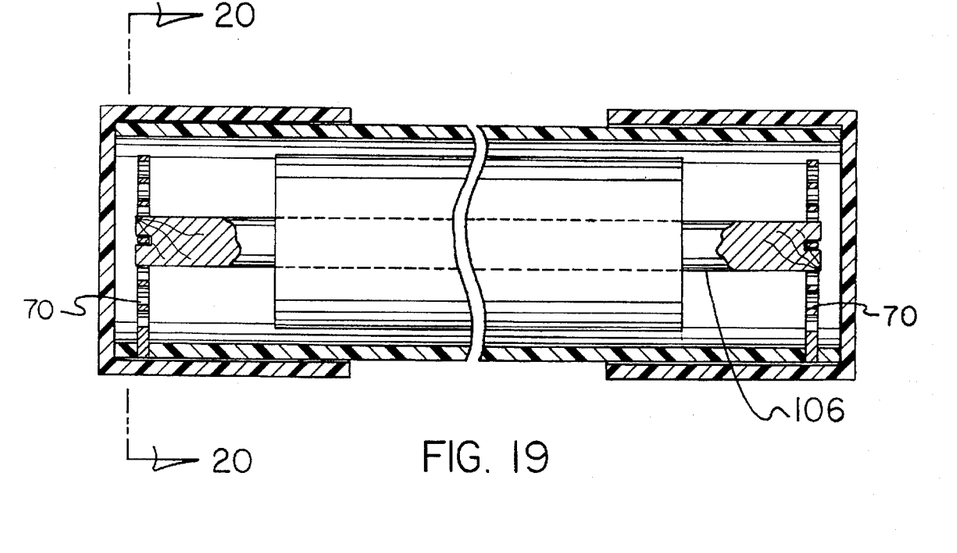
FIG. 19 is a cross-sectional view taken vertically through the center of a container constructed in accordance with an alternate embodiment of the invention.
Figure 20:
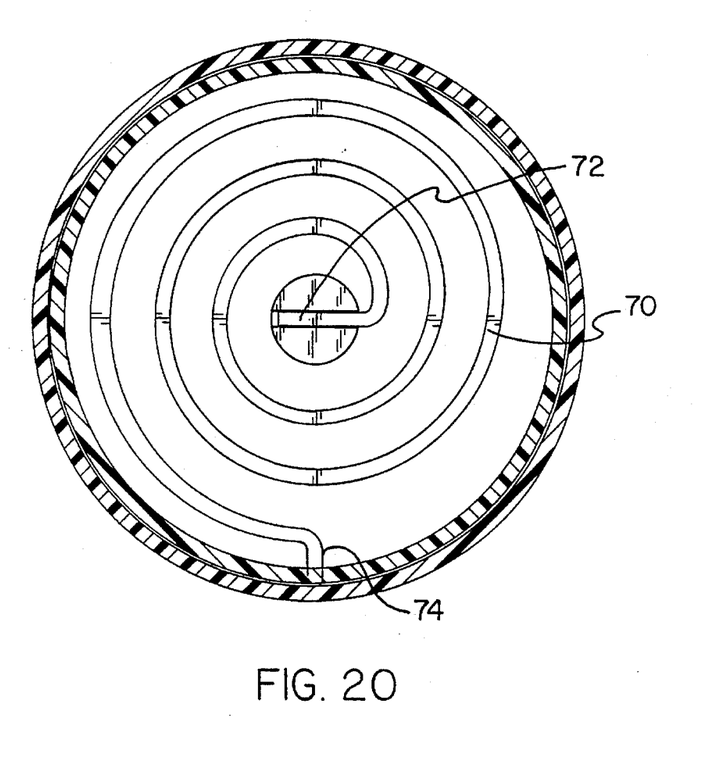
FIG. 20 is a cross-sectional view taken along section line 20—20 of FIG. 19.

Two end caps 104 are each coupled over an open end of the cylinder member. Each end cap includes a central axial aperture and a lower slot positioned in alignment with the lower slot of the cylinder member. The cylinder includes a central spool 106 rotatably coupled within the axial apertures of the end caps. A coil spring 70 is positioned within each end of the cylinder member. The coil spring has an interior end 72 coupled to the spool 106 and an exterior end 74 coupled to the container. In an operative orientation the coil spring functions to urge the flexible cover into a wound orientation within the cylinder member. Note FIGS. 3, 19 and 20.

The flexible cover 84 has long parallel side edges, short front and rear edges and a central extent. Each side edge includes a plurality of snap coupling devices 108 positioned along it. The rear edge is coupled to the spool of the cylinder member. An end cover frame 110 is formed in a rectangular configuration and coupled to the front edge of the cover. A pull cord 112 is affixed to the center point of the end cover frame. The end cover frame includes two projection members 114. In the stowed orientation the end cover frame is positioned within the open front end of the base member with the projections locked within two side holes 116 of the base member. Note FIG. 4.

The cover 84 is positioned in a wound orientation around the spool of the cylinder member in a stowed orientation. The cover is positioned over the bed of the pickup truck in an extended orientation. In the extended orientation the central extent of the cover extends through the aligned slots of the base member and cylinder member. The rectangular shape of the base member provides the necessary clearance area to ensure smooth removal and reentry of the flexible cover within the roll-up housing. The coil springs 70 of the cylinder member function to urge the cover to a wound orientation after the cover has been uncoupled from the support assembly of the apparatus. Note FIGS. 3, 19 and 20.

Figure 2:
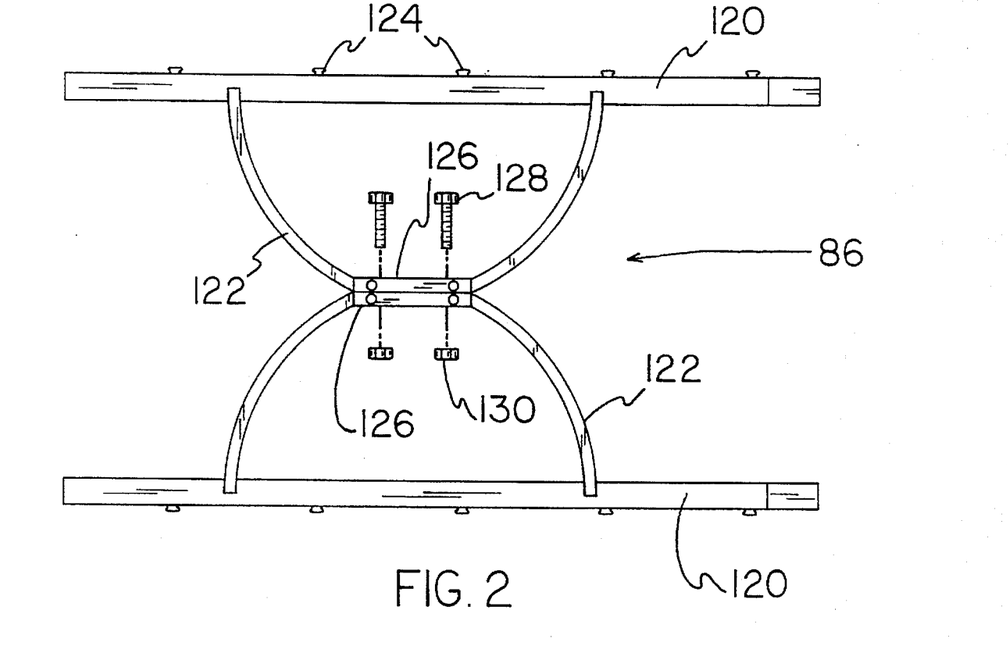
FIG. 2 is a top plan view illustrating the inner bars of the apparatus.

The support assembly 86 includes two side shafts 120 and two inner bars 122. Each side shaft is formed in an elongated rectangular configuration with an inner surface and an outer surface. Each outer surface includes a plurality of snap coupling devices 124 positioned along it to permit coupling with the snap coupling devices of the cover. Each side shaft is coupled upon a side wall 92 of the truck bed. Each inner bar is formed in a generally semicircular configuration with two free ends and a linear central rod 126. Each central rod has two bolt holes extending through it. Note FIG. 2.

The free ends of each inner bar 122 are coupled to the approximate center point of the inner surface of a side shaft. The central rods 126 of each inner bar are coupled together by two bolts 128 and nuts 130. The inner bars extend horizontally across the central region of the bed of the pickup truck. This configuration provides evenly distributed support for the cover. It also prevents items positioned underneath the inner bars from becoming dislodged and potentially damaging the cover during transport. In an extended orientation the cover is positioned over the inner bars with the snap coupling devices of the cover being coupled to the snap coupling devices of the side shafts. Note FIG. 2.

Figure 7:
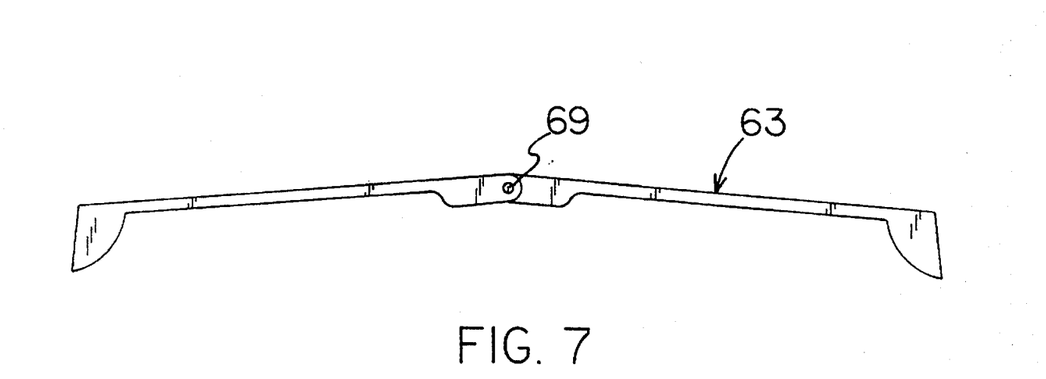
FIG. 7 is a side plan view of the foldable support bar of the second alternate embodiment of the apparatus.
Figure 8:
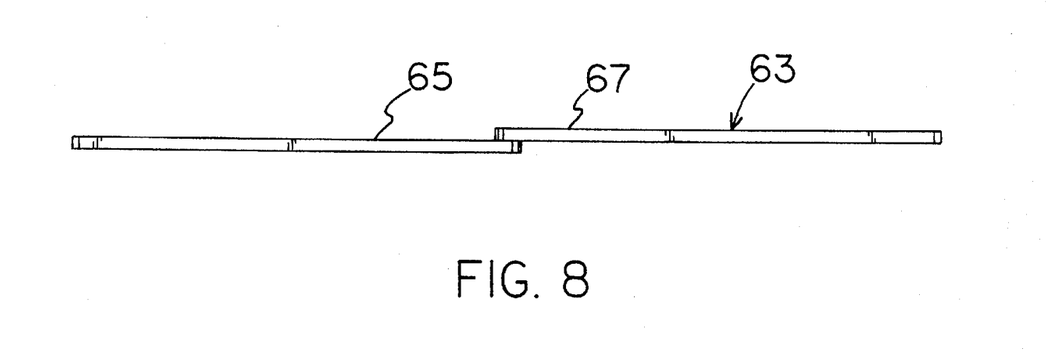
FIG. 8 is a top plan view of the foldable support bar of the second alternate embodiment of the apparatus.
Figure 9:
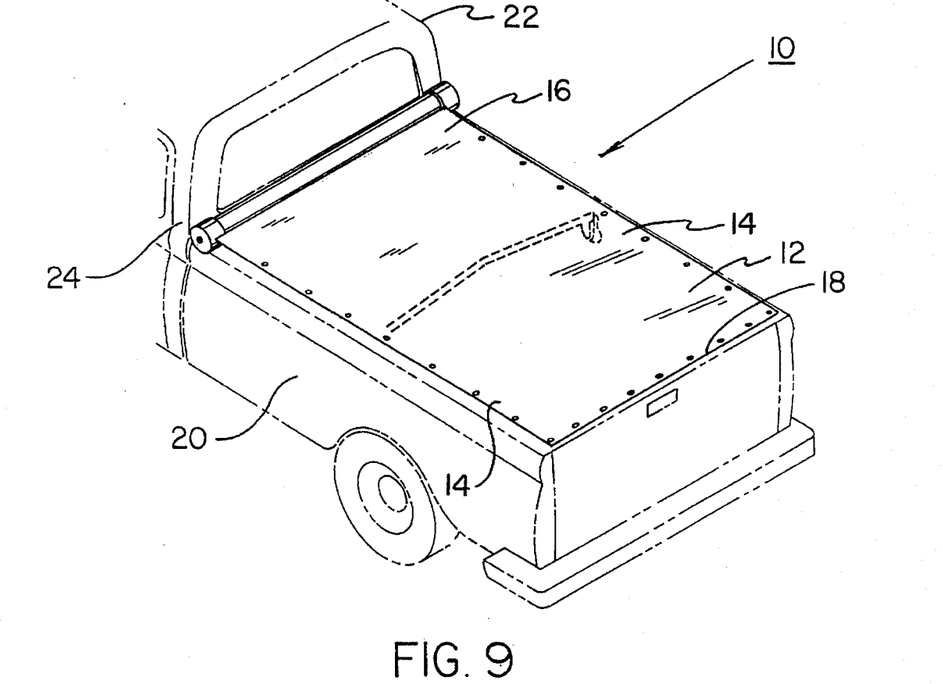
FIG. 9 is a perspective view of the first alternate embodiment of the apparatus.

A first alternate embodiment is shown in FIGS. 9 through 18. A second alternate embodiment is shown in FIGS. 7 and 8. In both embodiments the central component of the system 10 is a flexible cover 12. The cover has long parallel side edges 14. It also has short front and rear edges 16, 18. The front and rear edges couple the side edges. The cover is adapted to be positioned between an extended operative orientation as shown in FIG. 9 wherein it is located over the upper region of the bed 20 of a pickup truck 22. It is also positionable in a second stowed inoperative orientation wrapped in a coil adjacent to the front of the bed in proximity to the cab 24.

A next primary component of the all the embodiments of the invention is a container 28. Such container has an elongated cylindrical central extent 30. It also has concentric end caps 32 over the ends of the central extent. The end caps and central extents are formed with a continuous slot 34 facing rearwardly. The slot is for the passage of the cover therethrough.

The container 28 has a central spool 36. The spool is rotatably coupled within central axial apertures 40 of the end caps. Such support is for rotation of the spool with respect to the container. One end of the spool extends through its associated end cap. Such extending end is provided with threaded axial aperture 42 formed therein.

In addition to the foregoing, coupling means 46 are employed for securing the front edge of the cover to the exterior surface of the spool. In this manner, whereby rotation of the spool will wind the cover thereon as it passes to interior of the container through the slots. Conversely, rotation in the opposite direction of the spool will allow the pulling out of the cover from the spool through the slot. This is for movement to the operative orientation as shown in FIG. 9.

Positioning of the container and other components of the system 10 is effected through apertures 50. Such apertures are formed in the front edge of the container. These are for coupling to the rear of the cab of the truck as by bolts 52. Two such bolts are found acceptable.

In the first alternate embodiment, that of FIGS. 9 through 18, a crank 54 is employed. The crank has a first threaded end 56. Such threaded end is adapted to be threadedly coupled to the threaded axial aperture of the spool. The crank also has an outwardly extending radially displaceable handle 58. The handle is for rotating the spool. Such rotation will move the cover to the stored second orientation within the container.

Lastly provided for the first alternate embodiment is a support rod 62. Such support rod is positioned midway between the front and rear edges of the cover when extended in an operative first orientation. Brackets 64 are positioned on the interior surface of the side walls of the flat bed adjacent such central location. The brackets are for receiving the rod 62. The rod is formed with an elevated central extent 66 to effect the lifting of the cover in its central extent when in the first deployed operative orientation.

Figure 5:
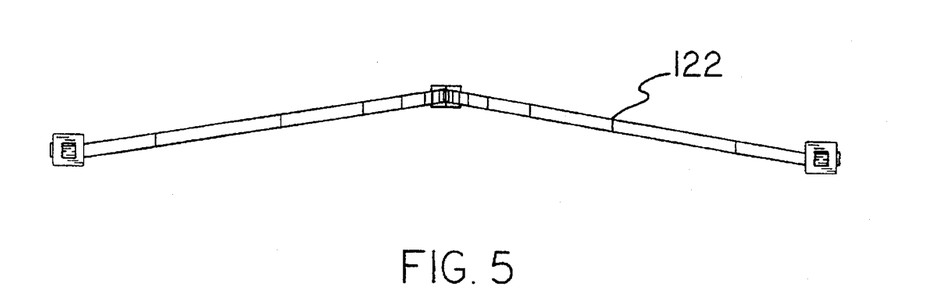
FIG. 5 is a bottom plan view of the foldable support bar of the second alternate embodiment of the apparatus.

A second alternate embodiment of the apparatus includes essentially all of the components of the first alternate embodiment except that the support rod 63 is formed of two separate halves 65, 67 which are rotatably coupled together at the elevated central extent of the rod by a pivot pin 69. The rod is foldable at the central extent to permit easy storage when not in use. Note FIGS. 5, 7 and 8.

In an alternate embodiment of the first and second alternate embodiments of the invention, the cord does not extend externally of the end caps. In its place, coil springs 70 are coupled to each end of the spool. The coil springs have an interior end 72 secured to the spool for rotation therewith. They also have an exterior end 74. The exterior end is coupled with respect to the central extent of the container. The coil spring is adapted to return the spool to a wound orientation to hold the cloth in the stowed orientation when so desired. The spring is also adapted to allow the cover to be moved to the operative extended orientation against the urging of the spring. Note FIGS. 19 and 20.

Figure 10:
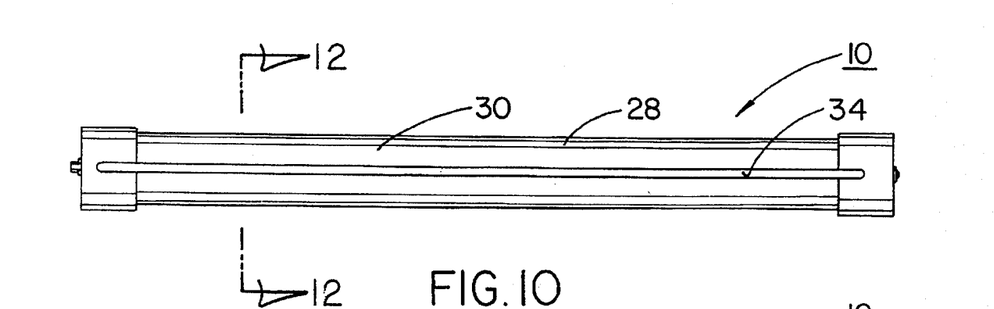
FIG. 10 is a front elevational view of the container shown in FIG. 9.
Figure 11:
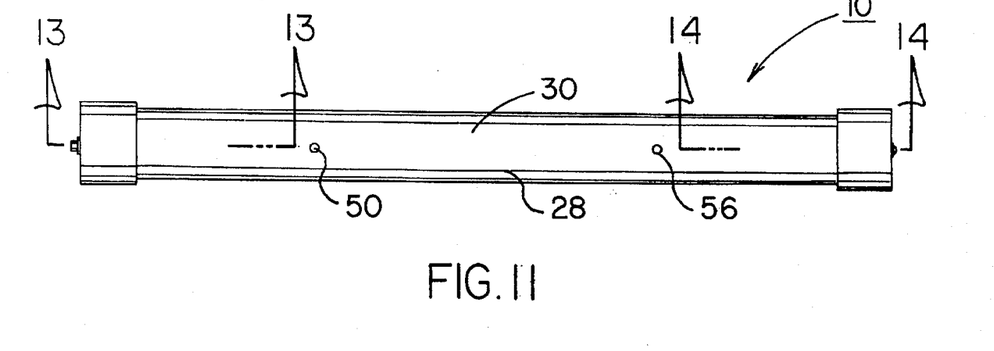
FIG. 11 is a rear view of the container shown in FIGS. 9 and 10.
Figure 12:
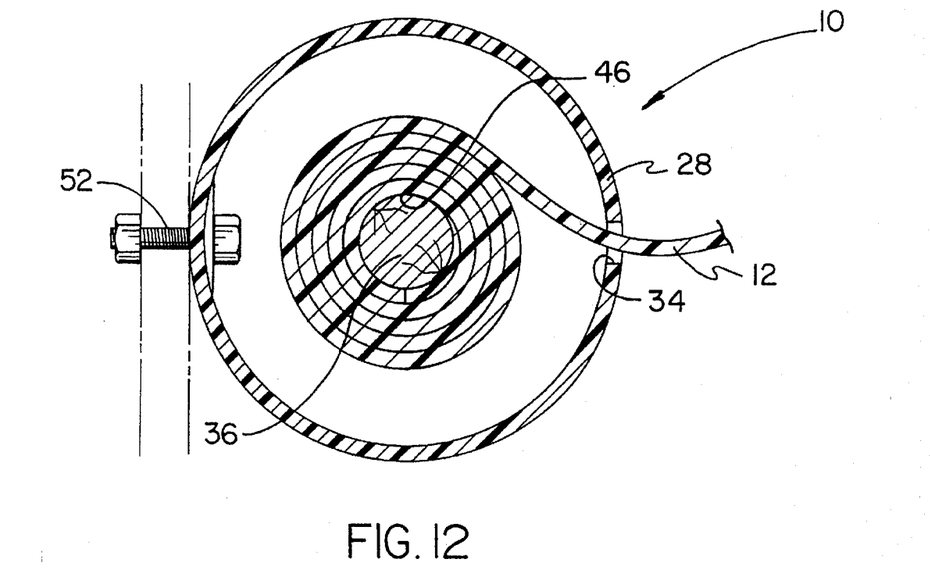
FIG. 12 is a cross-sectional view taken along section line 12—12 of FIG. 10.
Figure 13:
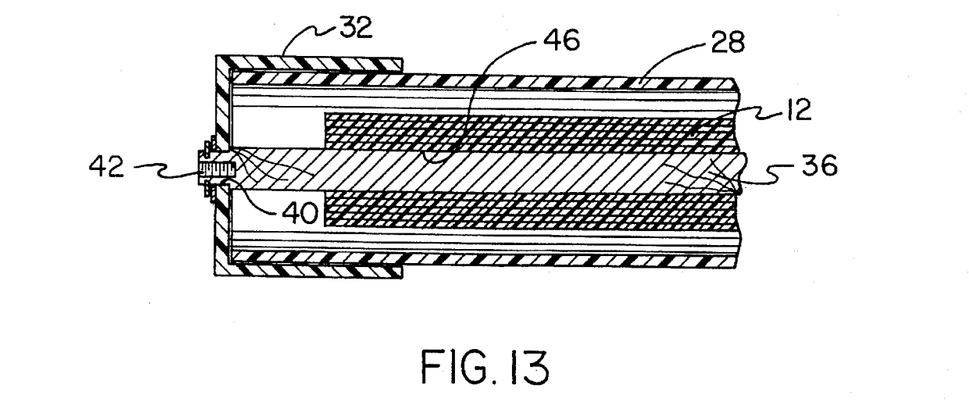
FIG. 13 is a cross-sectional view taken along line 13—13 of FIG. 11.
Figure 14:
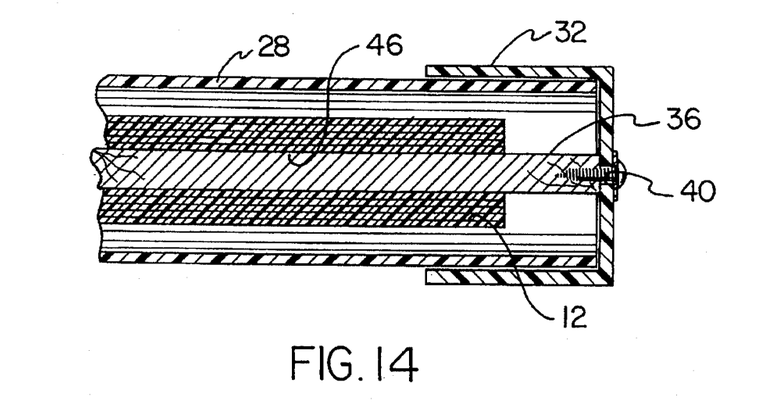
FIG. 14 is a cross-sectional view taken along line 14—14 of FIG. 11.
Figure 15:
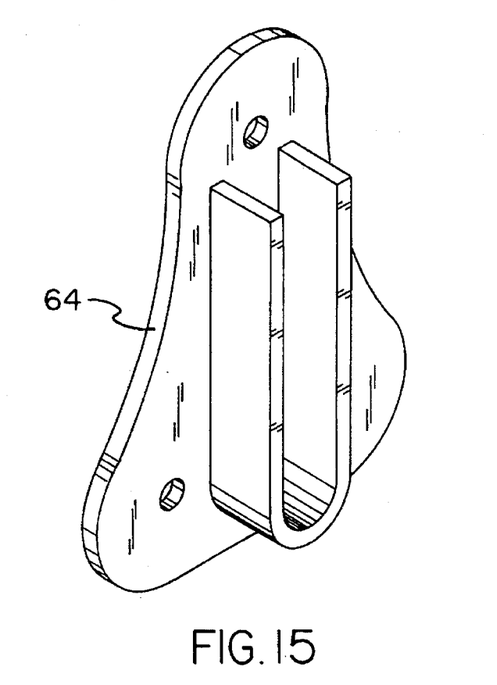
FIG. 15 is a perspective illustration of a U-shaped bracket of the first alternate embodiment of the apparatus.
Figure 16:
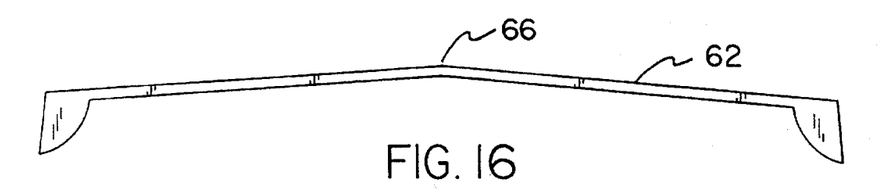
FIG. 16 is a front elevational view of the support rod of FIG. 9.
Figure 17:
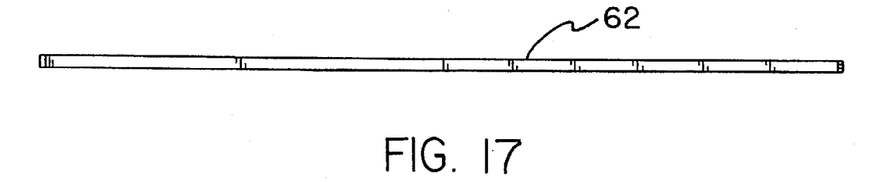
FIG. 17 is a top plan view of the support rod shown in FIG. 9.
Figure 18:
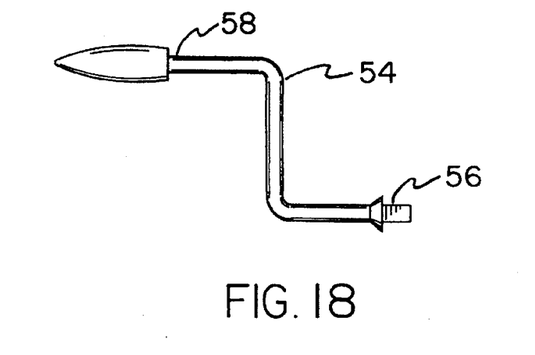
FIG. 18 is a front elevational view of the crank for use in association with the container of FIGS. 9–17.

In the first and second alternate embodiments of the apparatus coupling means 46 are provided for securing the front edge of the cover to the exterior surface of the spool. Such coupling means preferably take the form of an adhesive. Mechanical attachment means such as nails of tacks could readily be utilized. In this manner, rotation of the spool will wind the cover thereon as it passes to interior of the container through the slots. Opposite rotation of the spool will allow the pulling out of the cover from the spool through the slot. This allows for movement to the operative orientation as shown in FIG. 10. Next provided are apertures 50. Such apertures are formed in the front edge of the container. The apertures function to allow coupling of the rear of the cab of the truck to the container. Note FIG. 11.

Next provided in the first alternate embodiment is a crank 54. The crank has a first threaded end 56 adapted to be threadedly coupled to the threaded axial aperture of the spool. The crank also has an outwardly extending radially displaceable handle 58. The handle is for rotating the spool to move the cover to the stowed second orientation within the container.

When deployed, the cover requires a central support rod 62 for functioning in the most efficient manner. The support rod is positioned approximately midway between the front and rear edges of the cover when in the extended orientation. As noted above, an alternate support rod 63 may be formed of two pivotally coupled halves as shown in FIGS. 7 and 8.

The present invention features a window shade style cover which rolls in and out over the truck bed to protect the contents and keep the bed covered.

The device consists of two or three plastic bows, bow brackets, a roll cover made from PVC, vinyl, or plastic. It also includes housing for the roll, a locking mechanism, and a steel mounting bar. One end of the cover is fastened to the inside of the cover housing, and the other end has a series of snaps on it. Both ends of the cover housing have protective caps on them. One of the caps comes off to reveal a locking mechanism for the cover beneath it. The mounting bar is approximately ¼ inch thick and two feet wide and has two studs welded to it.

To install the cover, drill two holes in the back of the cab and secure the steel mounting bar and roll housing to the cab with bolts and nuts on the inside of the cab wall. Insert the rolled cover in the housing. Screw the bow brackets down along each side of the truck bed, near the top edge. Insert the bows in the brackets. Pull the cover out and over the brackets, and snap it into place.

It cannot be stolen because it is attached to the truck inside the cab. Braces keep the cover from sagging and add to its attractiveness. It can be used with tool boxes installed in truck beds, and the pullout and snap design makes it easy to use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved cover for the bed of a pickup truck with an associated roll-up housing comprising, in combination:

a truck having a cab and a truck bed, the truck bed having two side walls, a tailgate and a rear wall positioned adjacent to the cab, the rear wall having an upper extent;

two brackets each formed in an L-shaped configuration with a horizontal segment and a vertical segment, each bracket being coupled adjacent the upper extent of the rear wall of the truck bed;

a roll-up housing including a base member and a cylinder member, the base member being formed in a generally rectangular configuration with an essentially hollow interior, an open front and an upper slot, the base member being coupled to the horizontal segments of the brackets, the cylinder member being formed in a generally cylindrical configuration with two open ends, an essentially hollow interior and a lower slot, the cylinder member being coupled upon the base member with the respective slots in alignment, two end caps each being coupled over an open end of the cylinder member, each end cap including a central axial aperture and a lower slot positioned in alignment with the lower slot of the cylinder member, the cylinder including a central spool rotatably coupled within the axial apertures of the end caps, a coil spring being positioned within each end of the cylinder member and coupled to the spool;

a flexible cover having long parallel side edges, short front and rear edges and a central extent, each side edge including a plurality of snap coupling devices positioned therealong, the rear edge being coupled to the spool of the cylinder member, an end cover frame formed in a rectangular configuration and coupled to the front edge of the cover, a pull cord being affixed to the center point of the end cover frame, the cover being positioned in a wound orientation around the spool of the cylinder member in a stowed orientation, the cover being positioned over the bed of the pickup truck in an extended orientation with the central extent of the cover extending through the aligned slots of the base member and cylinder member, the coil springs of the cylinder member functioning to urge the cover to a wound orientation; and a support assembly including two side shafts and two inner bars, each side shaft being formed in an elongated rectangular configuration with an inner surface and an outer surface, each outer surface including a plurality of snap coupling devices positioned therealong, each side shaft being coupled upon a side wall of the truck bed, each inner bar being formed in a generally semicircular configuration with two free ends and a linear central rod, each central rod having two bolt holes extending therethrough, the free ends of each inner bar being coupled to the inner surface of a side shaft, the central rods of each inner bar being coupled together by two bolts and nuts, the inner bars extending horizontally across the bed of the pickup truck, in an extended orientation the cover being positioned over the inner bars with the snap coupling devices of the cover being coupled to the snap coupling devices of the side shafts.

2. A cover for the bed of a pickup truck with an associated roll-up housing adapted for use in association with a truck having a cab and a truck bed, the truck bed having two side walls, a tailgate and a rear wall, the cover comprising:

a flexible cover having long parallel side edges and short front and rear edges;

a container having an elongated cylindrical central extent and concentric end caps thereover, the container being formed with a continuous slot for the passage of the cover therethrough, the container being coupled to the rear wall of the truck and having a central spool rotatably coupled within the end caps, the rear edge of the cover being coupled to the spool, the cover being positionable in a wound orientation around the spool and an extended orientation over the bed of the pickup track;

two brackets each being coupled to the approximate center point of each side wall of the bed of the pickup truck each bracket including a slot; and a support rod having two ends each coupled within the slot of one of the brackets, the rod having an elevated central extent to effect the lifting of the center point of the cover when positioned in an extended orientation over the bed of the pickup truck;

wherein the support rod is formed of two separate halves being rotatably coupled together at the elevated central extent of the rod, the rod being foldable at the central extent to permit easy storage when not in use.

3. A cover for the bed of a pickup truck with an associated roll-up housing adapted for use in association with a truck having a cab and a truck bed, the truck bed having two side walls, a tailgate and a rear wall, the cover comprising:

a flexible cover having long parallel side edges and short front and rear edges;

a container having an elongated cylindrical central extent and concentric end caps thereover, the container being formed with a continuous slot for the passage of the cover therethrough, the container being coupled to the rear wall of the truck and having a central spool rotatably coupled within the end caps, the rear edge of the cover being coupled to the spool, the cover being positionable in a wound orientation around the spool and an extended orientation over the bed of the pickup truck;

a coil spring coupled to each end of the container, the coil spring having an interior end secured to the spool for rotation therewith and an exterior end coupled with respect to the container, the coil spring adapted to return the spool to a wound orientation to hold the cover in the stowed orientation, and adapted to allow the cover to be moved to the operative extended orientation against the urging of the springs;

wherein each side edge of the cover includes coupling devices to permit coupling to the side walls of the truck bed; and a support assembly including two side shafts and two inner bars, each side shaft being formed in an elongated rectangular configuration with an inner surface and an outer surface, each outer surface including a plurality of coupling devices positioned therealong, each side shaft being coupled upon a side wall of the truck bed, each inner bar being formed in a generally semicircular configuration with two free ends and a linear central rod, each central rod having two bolt holes extending therethrough, the free ends of each inner bar being coupled to the inner surface of a side shaft, the central rods of each inner bar being coupled together by two bolts and nuts, the inner bars extending horizontally across the bed of the pickup truck, in an extended orientation the cover being positioned over the inner bars with the coupling devices of the cover being coupled to the coupling devices of the side shafts.

4. A cover for the bed of a pickup truck with an associated roll-up housing adapted for use in association with a truck having a cab and a truck bed, the truck bed having two side walls, a tailgate and a rear wall, the apparatus comprising:

a flexible cover having long parallel side edges and short front and rear edges coupling the side edges, the cover adapted to be positioned between an extended operative orientation over the upper region of the bed of the pickup truck and a second stowed inoperative orientation in a coil adjacent to the front of the bed in proximity to the cab;

a container having an elongated cylindrical central extent with two free ends, concentric end caps with central axial apertures being positioned over the free ends, the container being circular in cross section, the end caps and central extent being formed with a continuous slot facing rearwardly for the passage of the cover therethrough, the container including a central spool with two free ends rotatably coupled within the central axial apertures of the end caps for rotation with respect thereto, a first free end of the spool extending through its associated end cap and including a threaded axial aperture formed therein;

adhesive for securing the front edge of the cover to the exterior surface of the spool whereby rotation of the spool will wind the cover thereon as it passes to interior of the container through the slot while the opposite rotation of the spool will allow the pulling out of the cover from the spool through the slot for movement to its operative orientation;

apertures formed in the front edge of the container for coupling to the rear of the cab of the truck;

a crank having a first threaded end adapted to be threadedly coupled to the threaded axial aperture in the first free end of the spool, the crank having an outwardly extending radially displaced handle for rotating the spool to move the cover to the stowed second orientation within the container; and a supporting rod positioned midway between the front and rear edges of the cover in the operative first orientation, brackets formed in a generally U-shaped orientation being affixed to the interior surface of the side walls of the truck bed adjacent such central location for receiving the rod, the rod having two upwardly angled halves meeting at a pointed elevated central extent to effect the lifting of the cover in its central extent when in the first orientation.

* * * * *